US009159056B2

(12) United States Patent
Hardas et al.

(10) Patent No.: US 9,159,056 B2
(45) Date of Patent: Oct. 13, 2015

(54) SYSTEM AND METHOD FOR DETERMINING THE VALUE OF A CROWD NETWORK

(75) Inventors: Manas S. Hardas, Fremont, CA (US); Lisa S. Purvis, Pleasanton, CA (US)

(73) Assignee: Spigit, Inc., San Francisco, CA (US)

( * ) Notice: Subject to any disclaimer, the term of this patent is extended or adjusted under 35 U.S.C. 154(b) by 0 days.

(21) Appl. No.: 13/545,162

(22) Filed: Jul. 10, 2012

(65) Prior Publication Data
US 2014/0019557 A1   Jan. 16, 2014

(51) Int. Cl.
G06F 15/16   (2006.01)
G06Q 10/10   (2012.01)
G06Q 50/00   (2012.01)

(52) U.S. Cl.
CPC .............. *G06Q 10/107* (2013.01); *G06Q 50/01* (2013.01)

(58) Field of Classification Search
USPC .................................................. 709/206, 224
See application file for complete search history.

(56) References Cited

U.S. PATENT DOCUMENTS

| 5,608,620 | A | 3/1997 | Lundgren |
| 6,466,928 | B1 | 10/2002 | Blasko et al. |
| 6,473,084 | B1 | 10/2002 | Phillips et al. |
| 6,606,615 | B1 | 8/2003 | Jennings et al. |
| 6,792,399 | B1 | 9/2004 | Phillips et al. |
| 6,795,793 | B2 | 9/2004 | Shayegan et al. |
| 6,912,511 | B1 | 6/2005 | Eliezer et al. |
| 7,130,777 | B2 | 10/2006 | Garg et al. |
| 7,155,510 | B1 | 12/2006 | Kaplan |
| 7,236,953 | B1 | 6/2007 | Cooper et al. |
| 7,249,077 | B2 | 7/2007 | Williams |
| 7,406,459 | B2 * | 7/2008 | Chen et al. ................. 715/205 |
| 7,415,436 | B1 | 8/2008 | Evelyn et al. |
| 7,519,562 | B1 | 4/2009 | Vander Mey et al. |
| 7,519,564 | B2 | 4/2009 | Horvitz |
| 7,542,881 | B1 | 6/2009 | Billiotte et al. |

(Continued)

FOREIGN PATENT DOCUMENTS

| GB | 2421812 | 7/2006 |
| WO | 0186532 | 11/2001 |

OTHER PUBLICATIONS

Almeida, Daniell, The Relevancy of Group Expertisefor the Accuracy of a Prediction Market, Erasmus School of Economics, May 2010.

(Continued)

*Primary Examiner* — Vivek Srivastava
*Assistant Examiner* — Hermon Asres
(74) *Attorney, Agent, or Firm* — Lessani Law Group, PC

(57) ABSTRACT

The present invention proposes that the value of a crowd network comes from network entropy and a very well engaged crowd has more value than a poorly engaged crowd. The engagement (and the resultant value generated from the engagement) of a crowd network can be measured in terms of the entropy of the network. The entropy is calculated as a function of the probability distribution of incoming and outgoing messages, which represents the entropy or uncertainty in the activity over the network. In this way, the activity occurring over a network in terms of message exchange is translated as a measure of the value of the network. An evolutionary algorithm is presented to optimize the entropy of a network by successively changing the network topology. Results indicate that the value of a crowd network very closely relate to its small world-ness, sparsity, and connectedness.

14 Claims, 8 Drawing Sheets

COMPUTING THE VALUE OF A CROWD NETWORK

(56) References Cited

U.S. PATENT DOCUMENTS

| | | | |
|---|---|---|---|
| 7,546,285 B1 | 6/2009 | Baker, Jr. | |
| 7,552,076 B1 | 6/2009 | Uenohara et al. | |
| 7,555,454 B2 | 6/2009 | Cooper et al. | |
| 7,565,313 B2 | 7/2009 | Waelbroeck et al. | |
| 7,566,270 B2 | 7/2009 | Amaitis et al. | |
| 7,590,554 B2 | 9/2009 | Chen et al. | |
| 7,668,773 B1 | 2/2010 | Pruitt | |
| 7,672,904 B2 | 3/2010 | Powell | |
| 7,707,062 B2 | 4/2010 | Abramowicz | |
| 7,716,329 B2* | 5/2010 | Lee et al. | 709/224 |
| 7,742,968 B2 | 6/2010 | Guler et al. | |
| 7,742,972 B2 | 6/2010 | Lange et al. | |
| 7,773,538 B2* | 8/2010 | Wang et al. | 370/253 |
| 7,865,418 B2 | 1/2011 | Uenohara et al. | |
| 7,880,741 B2 | 2/2011 | Proebsting et al. | |
| 7,974,904 B2 | 7/2011 | Frischer | |
| 7,996,296 B2 | 8/2011 | Lange | |
| 8,229,824 B2 | 7/2012 | Berg et al. | |
| 8,275,695 B2 | 9/2012 | Lange et al. | |
| 8,341,065 B2 | 12/2012 | Berg et al. | |
| 8,370,249 B2 | 2/2013 | Lange et al. | |
| 8,380,595 B1 | 2/2013 | Fogarty | |
| 8,396,777 B1 | 3/2013 | Fine et al. | |
| 8,583,470 B1 | 11/2013 | Fine et al. | |
| 8,606,618 B2 | 12/2013 | Dabke | |
| 8,612,331 B2 | 12/2013 | Hanson et al. | |
| 8,788,386 B1 | 7/2014 | Fogarty | |
| 2002/0038321 A1 | 3/2002 | Keeley | |
| 2002/0073009 A1 | 6/2002 | Hogg et al. | |
| 2002/0095305 A1 | 7/2002 | Gakidis et al. | |
| 2002/0107722 A1 | 8/2002 | Laurin et al. | |
| 2003/0074166 A1 | 4/2003 | Jackson et al. | |
| 2003/0078829 A1 | 4/2003 | Chen et al. | |
| 2004/0002891 A1 | 1/2004 | Chen et al. | |
| 2004/0153456 A1 | 8/2004 | Charnock et al. | |
| 2004/0162751 A1 | 8/2004 | Tsyganskiy et al. | |
| 2004/0176994 A1 | 9/2004 | Fine et al. | |
| 2005/0021441 A1 | 1/2005 | Flake et al. | |
| 2005/0108120 A1 | 5/2005 | Malka et al. | |
| 2005/0114161 A1 | 5/2005 | Garg et al. | |
| 2005/0228739 A1 | 10/2005 | Leibowitz | |
| 2005/0256800 A1 | 11/2005 | Hogg et al. | |
| 2006/0117303 A1 | 6/2006 | Gizinski | |
| 2006/0122927 A1 | 6/2006 | Huberman et al. | |
| 2006/0205483 A1 | 9/2006 | Meyer et al. | |
| 2006/0206365 A1 | 9/2006 | Boardman et al. | |
| 2006/0224442 A1 | 10/2006 | Round et al. | |
| 2007/0078699 A1 | 4/2007 | Scott et al. | |
| 2007/0078756 A1 | 4/2007 | Hogg et al. | |
| 2007/0136105 A1 | 6/2007 | Huberman et al. | |
| 2007/0136429 A1 | 6/2007 | Fine et al. | |
| 2007/0198387 A1 | 8/2007 | Uenohara et al. | |
| 2007/0250429 A1 | 10/2007 | Walser et al. | |
| 2007/0256093 A1 | 11/2007 | Hiler | |
| 2007/0288579 A1 | 12/2007 | Schunemann | |
| 2008/0120166 A1 | 5/2008 | Fernandez et al. | |
| 2008/0140786 A1 | 6/2008 | Tran | |
| 2008/0222191 A1 | 9/2008 | Yoshida et al. | |
| 2008/0281610 A1 | 11/2008 | Yoshida et al. | |
| 2008/0288209 A1 | 11/2008 | Hunt et al. | |
| 2008/0288326 A1 | 11/2008 | Abramowicz | |
| 2008/0319825 A1 | 12/2008 | LaComb et al. | |
| 2009/0024549 A1* | 1/2009 | Johnson | 706/46 |
| 2009/0073174 A1 | 3/2009 | Berg et al. | |
| 2009/0076939 A1 | 3/2009 | Berg et al. | |
| 2009/0076974 A1 | 3/2009 | Berg et al. | |
| 2009/0094039 A1 | 4/2009 | MacDonald et al. | |
| 2009/0182624 A1 | 7/2009 | Koen et al. | |
| 2009/0198565 A1 | 8/2009 | Pluschkell et al. | |
| 2009/0254386 A1 | 10/2009 | Wang et al. | |
| 2009/0254475 A1 | 10/2009 | Pennock et al. | |
| 2009/0313350 A1* | 12/2009 | Hundscheidt et al. | 709/217 |
| 2009/0327054 A1 | 12/2009 | Yao et al. | |
| 2010/0058249 A1 | 3/2010 | Sarkar et al. | |
| 2010/0179930 A1 | 7/2010 | Teller et al. | |
| 2011/0137848 A1 | 6/2011 | Stephens | |
| 2012/0089617 A1 | 4/2012 | Frey | |
| 2012/0130860 A1 | 5/2012 | Suzuki et al. | |
| 2012/0150585 A1 | 6/2012 | Dabke | |
| 2012/0239608 A1 | 9/2012 | Rinearson | |
| 2013/0262193 A1 | 10/2013 | Sundaresan | |
| 2013/0311455 A1 | 11/2013 | Kritt et al. | |
| 2013/0332468 A1 | 12/2013 | Hardas et al. | |
| 2013/0346501 A1 | 12/2013 | Hardas et al. | |
| 2014/0025690 A1 | 1/2014 | Tareen et al. | |
| 2014/0108426 A1 | 4/2014 | Goldberg et al. | |

OTHER PUBLICATIONS

Bao, Yong et al., Comparing Density Forecast Models, Journal of Forecasting, vol. 26, 2007.

CFO and Crowdcast Launch Financial Prediction Market, PRWeb, Jul. 16, 2009.

Chen, Kay-Yut et al., Eliminating Public Knowledge Biases in Information Aggregation Mechanisms, HP Laboratories, Mar. 21, 2003.

Chen, Kay-Yu et al., Forecasting Uncertain Events with Small Groups, HP Laboratories, Jun. 25, 2001.

Chen, Kay-Yut et al., Predicting the Future, Information Systems Frontier, vol. 5, No. 1, 2003.

Dubil, Robert, Economic Derivatives Markets-New Opportunities for Individual Investors: A Research Agenda, Financial Services Review, vol. 6, No. 2, pp. 89-104, Summer 2007.

Harnessing Collective Intelligence to Improve Strategic Planning, Crowdcast, White Paper, 2010.

Ledyard, John et al., An Experimental Test of Combinatorial Information Markets, Dec. 2007.

Crowdcast.com web pages, Crowdcast, Jul. 2009.

Marzban, Caren, The ROC Curve and the Area under it as Performance Measures Weather and Forecasting, vol. 19, 2004.

Myung, In Jae et al., Maximum Entropy Aggregation of Expert Predictions, Management Science, vol. 42, No. 10, Oct. 1996.

Pennock, David M. et al., The Power of Play: Efficiency and Forecast Accuracy in Web Market Games, NEC Research Institute Report, 2000-168, Feb. 17, 2001.

Plott, Charles R., et al., Information Aggregation Mechanisms: Concept, Design, and Implementation for a Sales Forecasting System, California Institute of Technology, Mar. 2002.

Schrieber, Jared M., The Application of Prediction Markets to Business, MIT, Jun. 2004.

Ullah, Aman, Entropy, divergence and distance measures with econometric applications, Journal of Statistical Planning and Inference, vol. 48, 1996.

Vaughan, J.W., Learning from collective preferences, behavior, and beliefs. (Order No. 3381885, University of Pennsylvania). ProQuest Dissertations and Thesis, 152, 2009.

Wolfers, Justin et al., Interpreting Prediction Market Prices as Probabilities, Jan. 8, 2007.

Wolfers, J., et al., Prediction markets. The Journal of Economic Perspectives, 18(2), 107-126, 2004.

* cited by examiner

COMPUTING THE VALUE OF A CROWD NETWORK

SYSTEM AND METHOD FOR DETERMINING THE VALUE OF A CROWD NETWORK

TECHNICAL FIELD

The present invention relates generally to social media and social networks and, more particularly, to system and method for determining the effectiveness and engagement of a crowd network based on the message-passing between the nodes of a network. This measure is called as network entropy.

BACKGROUND

In the recent past it is increasingly being observed that social media plays an important role in putting a dormant crowd into action. The most recent examples of social media fueled crowd activism are the Egyptian revolution, the Spanish May 15$^{th}$ movement, and the most recent Occupy Wall Street protests that spread out across many cities in the United States. The common underlying theme in all these examples of activism is the intelligent use of social media such as Facebook, Twitter, etc. to bring a crowd into action. Beneath any crowd is a network of people who are engaged towards a common goal for a crowd to perform a purposeful action. Therefore, it is desirable to be able to understand why and how the engagement of a crowd changes from time to time. For example, some movements start off great but die out soon, some movements start out small but pick up momentum and turn into a full-fledged revolutions.

Crowds can be represented as complex networks. Most real complex networks, such as telecommunication networks, are not homogeneously linked by similar type of edges. Most real complex networks display certain characteristic properties like small world phenomenon and scale free distributions. Today's hyper-connected networks of people, information, and devices pose an entirely different challenge—in order to extract the value of today's crowd networks, it is not enough to understand simply the connections of the network. It is also important to understand the activity on those connections, representing the engagement of the crowd, and how it grows or shrinks over time and under what conditions. Only then the true value of the crowd network can be extracted.

Complex network properties like clustering, shortest path lengths, etc. are traditional measures for examining properties of a graph network. In the case of a social network, the notion of 'engagement' or 'activity' between the people/nodes in the network is an important aspect. Engagement has certain properties like working towards a common goal or working in parallel on different tasks to achieve a common higher task, etc. Up until now, however, the relationship between engagement and network structures has not been well-defined. This invention provides a method for computing the value of a social network based on network entropy and for extracting the network structures that contribute to that value.

SUMMARY

The present invention proposes that the value of a crowd network comes from network entropy and a very well engaged crowd has more value than a poorly engaged crowd. The engagement (and the resultant value generated from the engagement) of a crowd network can be measured in terms of the entropy of the network. The entropy is calculated as a function of the probability distribution of incoming and outgoing messages, which represent the entropy or uncertainty in the activity over the network. In this way, the activity occurring over a network in terms of message exchange is translated as a measure of the value of the network. An evolutionary algorithm is also presented to optimize the entropy of a network by successively changing the network topology. Results indicate that the value of a crowd network very closely relate to its small world-ness, sparsity, and connectedness.

In one novel aspect, a method for computing the value of a crowd network by a server computer is proposed. First, the server collects statistics information representing communication activities among a total of n communication nodes in the crowd network. Next, the server constructs an adjacency matrix A, an incoming message probability matrix X, and an outgoing message probability matrix Y of the crowd network. Next, the server computes an inbound entropy $H^{in}$ of the crowd network using matrices A and X, and an outbound entropy $H^{out}$ of the crowd network using matrices A and Y. Finally, the server calculates the value of the crowd network using the inbound entropy $H^{in}$, the outbound entropy $H^{out}$, and a pre-defined weighting parameter $\alpha$, and outputs the value indicating an engagement level of the crowd network.

In one embodiment, the crowd is formed by users registered in a social network website, such as Facebook, LinkedIn, or Twitter. If users i and j are connected (e.g., friends in Facebook, connected in LinkedIn, or follower in Twitter), then there is an edge/link in the graph and the corresponding element $a_{ij}$ in the adjacency matrix is 1. Also, the incoming and outgoing message probabilities can be determined by how much interaction has occurred between these two users. In another embodiment, a crowd network consists of all the email users in a public email server such as Gmail, Yahoo Mail, or Hotmail. In this case, the incoming and outgoing message probabilities between two email users can be simply calculated from the number of emails received and sent among the email users. In yet another embodiment, all mobile phone users from a service provider such as Verizon, AT&T, or Sprint forms a crowd network. The message probability matrices can be determined by the usage of phone calls and/or texting among the mobile phone users. These are examples of explicit message-passing in networks. The same can be imagined for implicit message-passing. For example, passing of social cues such as buying a product.

In another novel aspect, the relationship between the engagement/entropy of a crowd and its corresponding network structural parameters is identified. In one embodiment, an entropy maximization algorithm is proposed. The main objective of the algorithm is to find a network topology that maximizes the entropy of the network (e.g., the value of the crowd) in terms of the incoming and outgoing probability distributions of the crowd network. From this process, it can be seen that crowds which are better engaged do seem to be small worlds with high clustering and low average shortest path length. They also generally seem to be densely connected into a single giant connected component. Understanding more deeply the aspects of crowd network structures that contribute to the overall collective value will enable new use and applications of crowds and effective leverage of crowd behaviors for future problem solving.

In the above-mentioned examples, the network structure and communication activity are autonomous. For example, whoever participated in a social network website is not planned. Also the communication activity among all the users is not controlled as well. However, in some other cases, a crowd network could be a controlled network, i.e. the nodes and communication among the nodes are managed and can be adjusted. For example, a managed organization where people's communication activity pattern is ordered to follow certain structure such as management structure. Power grid is another controlled connected network where the structure can be adjusted for better performance. In these applications, a higher value of the crowd is likely to imply a better efficiency and effectiveness. Therefore, by adjusting the network to reach its maximum entropy (e.g., value), the optimal operational efficiency can be achieved. It is another innovative aspect of the present invention that a heuristic method is proposed to finding the network topology and communication activity pattern that produce the maximum value of the crowd.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
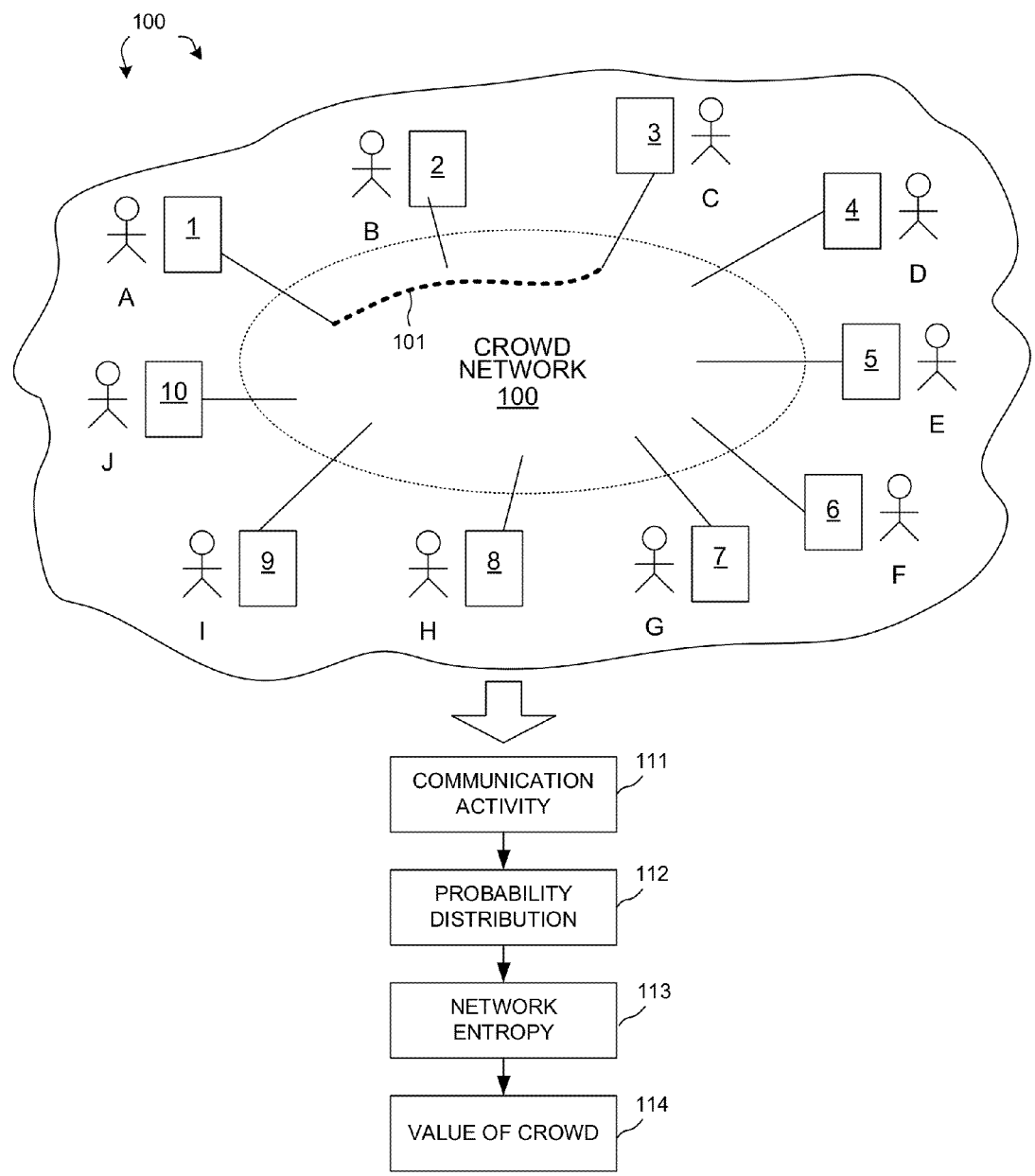
FIG. 1 illustrates a crowd network and basic steps of computing the value of a crowd network in accordance with one novel aspect.

FIG. 1 illustrates a crowd network 100 and basic steps of computing the value of the crowd in accordance with one novel aspect. Crowd network 100 is formed by a plurality of communication nodes (e.g., nodes 1-10) representing a plurality of connected (or non-connected) individuals (e.g., people A-J) via communication links. Typically, a crowd network can be defined as a complex network of people that can be represented by a graph consisting of vertices/nodes and edges/links. A vertex/node represents a person (e.g., node 1 represents person A) and an edge/link represents the connectivity between two people (e.g., communication link 101 between person A and person C).

A crowd network is very different from typical static and structured communication networks. Although underlying the crowd network is a social network of connected individuals via communication links, the phenomenon of crowd happens only in the presence of certain characteristic conditions. One of the central conditions is the messaging activity that happens between the individuals which form the crowd. The so-called value of a crowd network comes from the ability of the individuals to interact with each other and communicate with each other by sending and receiving messages. It is because of this activity on the communication links of the crowd network that creates the power and capability to achieve valuable actions ad results.

A crowd network has structural and behavioral complexities not present in a more static communication network. As such, crowd networks have significantly different dynamics and models of information and opinion spreading than a more predictable device communication network. Key differences are the social clustering that happens in a crowd network—effectively creating clusters of large strong connected components, as well as a typically small amount of weak links that connect the entire network into one. Furthermore, the activity of communications across the connected links as well as the triggers for growth or decline of that activity creates emergent network effects whose drivers today are largely unknown and undefined. It has been shown that the value of the crowd response in real-life crowd networks hinged on communication activity throughout the network, i.e., engagement and growth of that engagement.

In one novel aspect, the value of a crowd network can be defined in terms of the overall engagement of the individuals within the crowd. It is proposed that a very well engaged crowd has more value than a crowd that is not engaged. If the activity among the nodes is high, then it means that the crowd is better engaged. On the other hand, if the activity among the nodes is low, then it means that the crowd is less engaged. The activity between any two nodes can be measured as the number of messages exchanged between the two nodes. Therefore, engagement is hypothesized as messages being exchanged over the crowd network, and the value of the crowd network is calculated from the network entropy of incoming and outgoing message probability distributions.

As illustrated in FIG. 1, statistics information on communication activity in a crowd network is collected in step 111 (e.g., the number of messages being exchanged between node 1 and node 3 via link 101). In step 112, probability distributions of incoming and outgoing messages among the nodes are constructed based on the communication activity. Next, cumulative incoming and outgoing message entropies of the network are calculated in step 113 based on the probability distributions. Finally, in step 114, the value of the crowd network is computed. The details of each step are now illustrated below.

Let a crowd network C be represented by a graph $G=(V, E)$, where $V=\{v_1, v_2, \ldots, v_n\}$ and $E=\{e_1, e_2, \ldots, e_m\}$, where n is the number of nodes and $m<=n(n-1)/2$ is the number of links. The graph G is represented by an adjacency matrix $A=\{a_{ij} | i, j<=n\}$ in which each element $a_{ij}=[0, 1]$ denotes the existence of a communication link between nodes i and j. If no link exists, then $a_{ij}=0$. Otherwise, $a_{ij}=1$. In general, a graph representing a network can be directional (where the link has direction) or non-directional (where the links has no direction). Furthermore, a graph can have weighted links with a numerical value associated to each link or un-weighted links having uniformly equal weight. More specifically, the direction of a link corresponds to the direction of receiving (incoming) or sending (outgoing) messages between two nodes, and the weight of each link corresponds to the probability of receiving or sending messages between the two nodes.

Figure 2A:
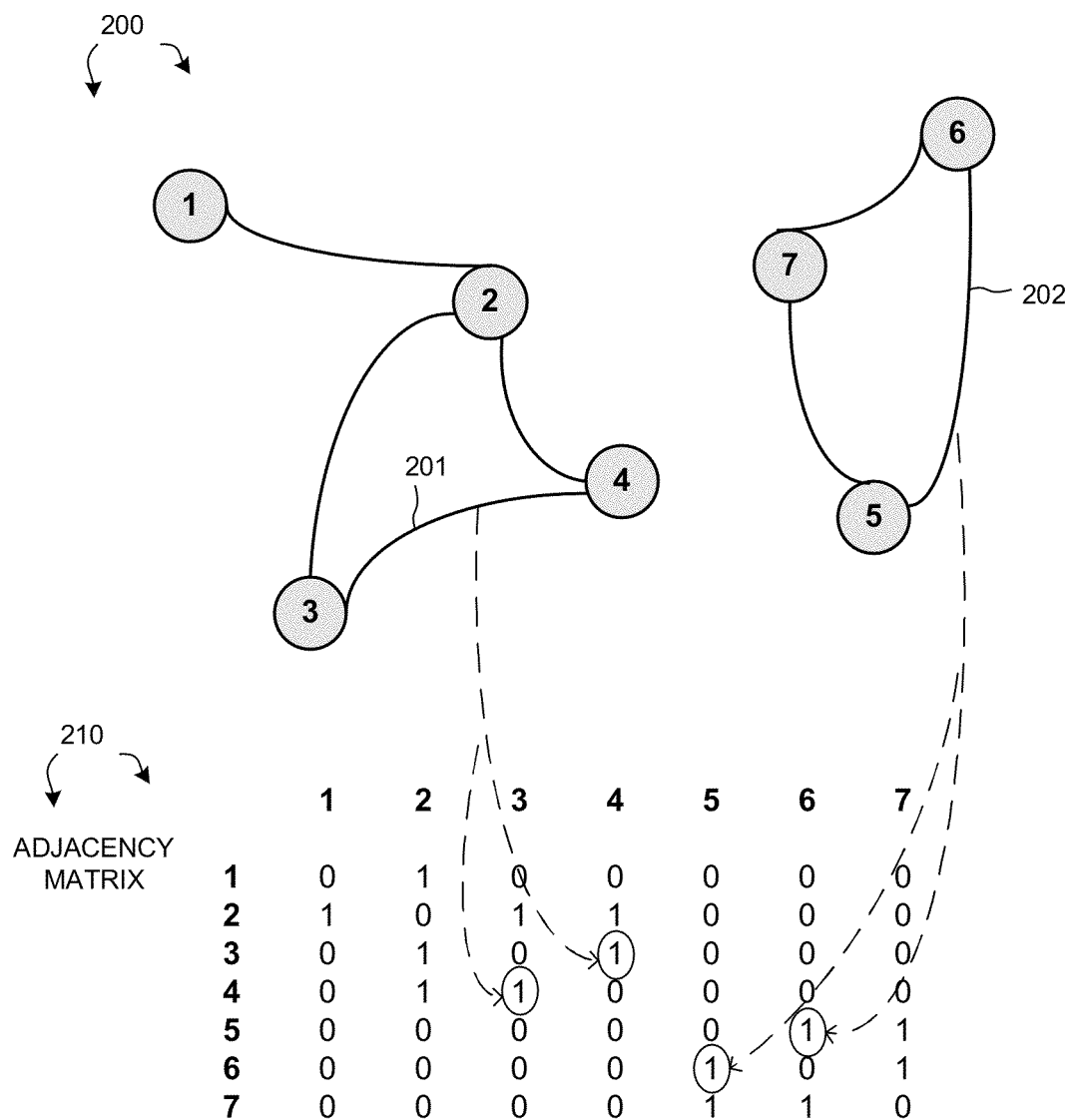
FIG. 2A illustrates a crowd network and its corresponding adjacency matrix.

FIG. 2A illustrates a crowd network 200 represented by an undirected graph with un-weighted links. In this case, the real world communicating individuals are represented as nodes and connections among the nodes are presented as links. The topology or connectivity of such non-directional graph can also be represented in a symmetric adjacency matrix A 210, where $A=\{a_{ij}|i,j<=n\}$, and each element in the matrix is either 1 or 0. The size of the matrix n is equal to the number of nodes. If node i and node j are connected, then the matrix element $a_{ij}=1$ at row i and column j. If node i is not connected to node j, then the matrix element $a_{ij}=0$ at row i and column j. If no link to self is allowed, then it is usually represented as $a_{ii}=0$. Since matrix A 210 is symmetric, $a_{ij}=a_{ji}$. In the example of FIG. 2A, since node 3 and node 4 are connected via link 201, the corresponding matrix elements $a_{34}$ and $a_{43}$ are 1. Similarly, since node 5 and node 6 are connected via link 202, the corresponding matrix elements $a_{56}$ and $a_{65}$ are 1.

Figure 2B:
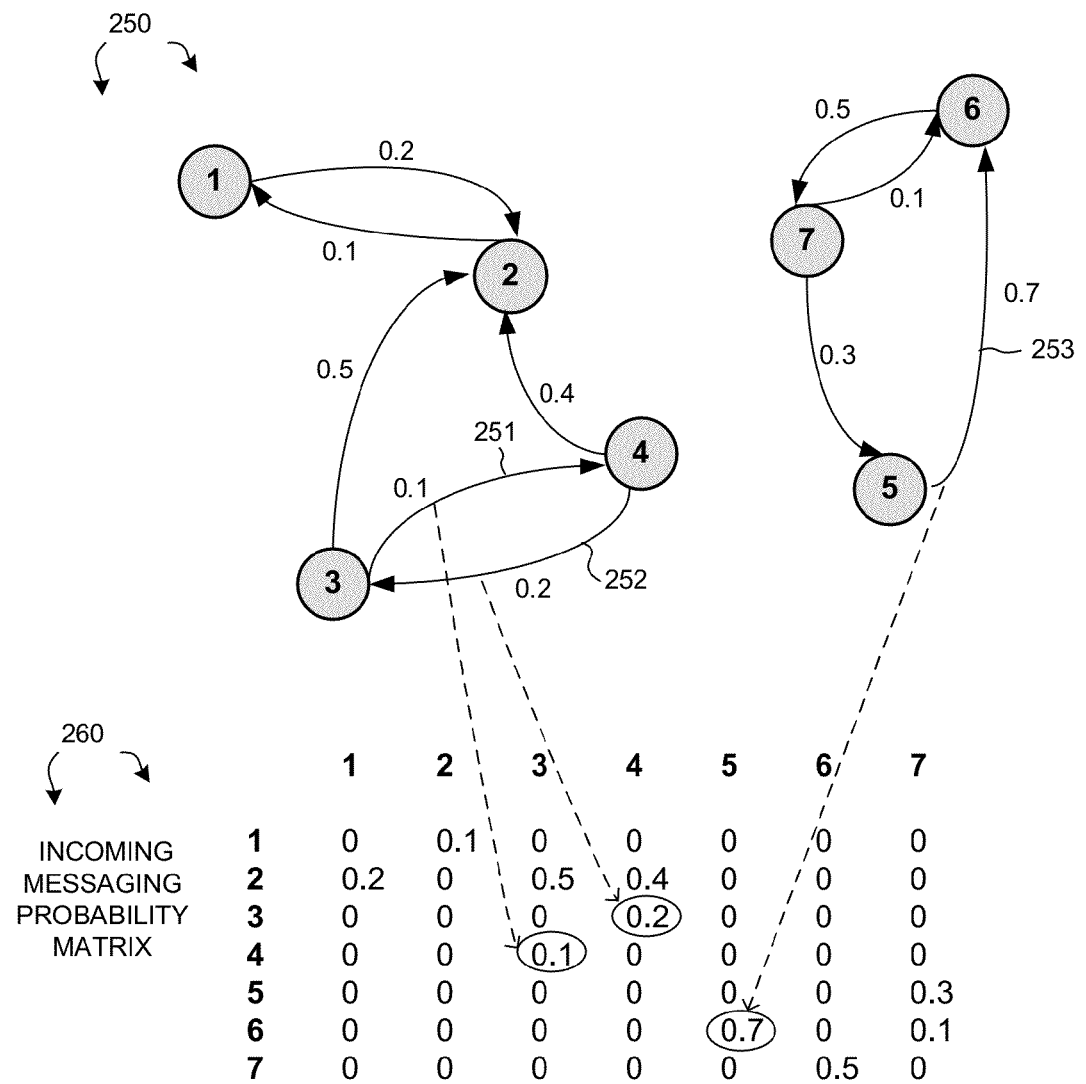
FIG. 2B illustrates a crowd network and its corresponding message probability matrix.

FIG. 2B illustrates a crowd network 250 represented by a directed graph with weighted links. In this case, the real world communicating individuals are represented as nodes and communication activity (e.g., receiving and sending messages) among the individuals are presented as directional links with associated weights. The direction of a link corresponds to the direction of a message exchanged between the individuals. For example, link 251 in FIG. 2B is from node 3 to node 4 and it represents messages sent from node 3 to 4. The weight of a link corresponds to the probability of sending or receiving messages on the link. If a link is incoming to a node, then the weight on the link represents the incoming probability of the node receiving messages from another node in the network. If a link is outgoing from a node, then the weight on the link represents the outgoing probability of the node sending messages to another node in the network.

The probability distribution of such weighted directional graph can also be represented by two matrices X and Y. The incoming messaging probability distribution matrix $X=\{x_{ij}|i,j<=n\}$, where each element in the matrix is the probability of node i receiving messages from node j. The outgoing messaging probability distribution matrix $Y=\{y_{ij}|i,j<=n\}$, where each element in the matrix is the probability of node i sending messages to node j. The size of the matrices n is equal to the number of nodes. In the example of FIG. 2B, an incoming message probability distribution matrix 260 is illustrated. For example, edge 251 having weight 0.1 corresponds to element $x_{43}=0.1$, which means the probability for node 4 to receiving messages from node 3 is 0.1. In another example, edge 252 with weight 0.2 corresponds to element $x_{34}=0.2$, which means the probability for node 3 to receiving messages from node 4 is 0.2. In yet another example, edge 253 with weight 0.7 corresponds to element $x_{65}=0.7$, which means the probability for node 6 to receiving messages from node 5 is 0.7. Similarly, an outgoing message distribution matrix Y can be constructed based on the probability of sending messages between any two nodes in the crowd network (not shown in FIG. 2B).

Once the adjacency Matrix A, the incoming message probability matrix X, and the outgoing message probability matrix Y are constructed for a given crowd network, its network entropy and value can then be computed. The entropy of a network is the measure of the uncertainty in a network. It measures the network's heterogeneity in terms of the diversity in the incoming and outgoing message distributions. The value of a node is calculated in terms of the incoming and outgoing message entropy, which is the entropy of the incoming probability and outgoing probability distributions associated with the particular node. Note that the entropy here does not try to measure the actual information content of the messages being exchanged, but only the randomness in the incoming and outgoing message probability distributions. The cumulative incoming and outgoing message entropies of a network are calculated as the summation of all the individual incoming and outgoing node entropies. Thus, $$H^{in} = \sum_{i=1}^{n} \sum_{j=1}^{n} a_{ij} * x_{ij} \log\left(\frac{1}{x_{ij}}\right) \quad (1)$$

$$H^{out} = \sum_{i=1}^{n} \sum_{j=1}^{n} a_{ij} * y_{ij} \log\left(\frac{1}{y_{ij}}\right)$$

Finally, the total value of a crowd network C is calculated as a weighted measure of the incoming and outgoing entropies of the network. Thus, the value is represented as a function of weighing variable $\alpha$. The variable allows for weighing in the incoming and the outgoing network entropies.

$$V(\alpha)=\alpha H^{in}+(1-\alpha)H^{out} \quad (2)$$

Figure 3:
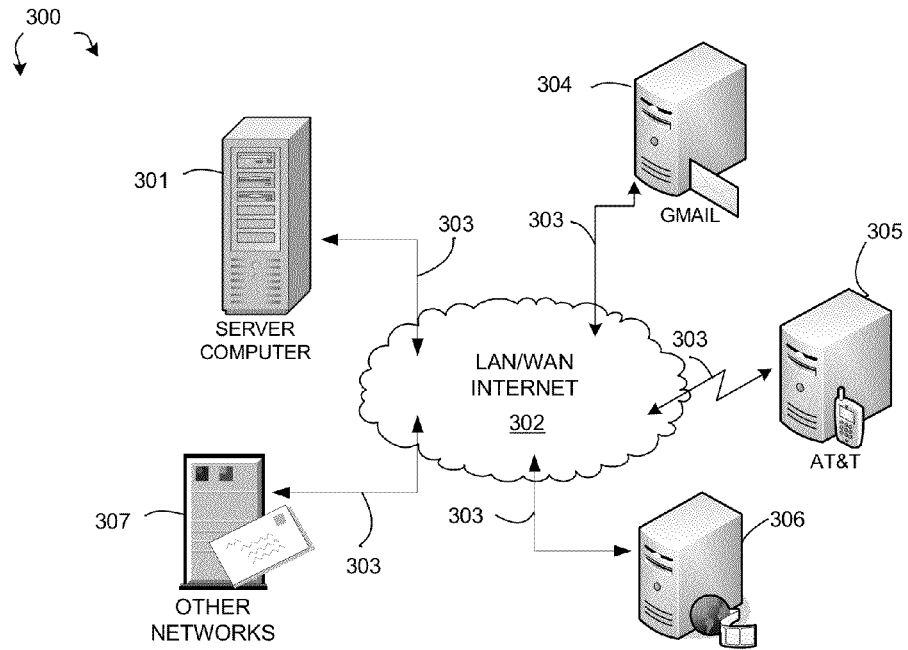
FIG. 3 is a high level diagram illustrating a system that computes the value of a crowd network in accordance with one novel aspect.

FIG. 3 illustrates a computer-based system 300 according to the present invention for computing the value of a crowd network. System 300 comprises a server computer 301, a Local area network (LAN) or wide area network (WAN) or Internet 302, a plurality of network connections 303, and a plurality of data source servers 304-307. The server computer 301 furnishes users with input and output interfaces. Data source servers 304, 305 and 306 provide network interfaces for server computer 301 to retrieve data statistics of a particular crowd network. Network 302 provides connectivity via wired or wireless network connections 303 between server computer 301 and data source servers 304-307.

The data source servers are used for the server computer to retrieve statistics information representing communication activity of a particular crowd network. In a first example, data source server 304 is a public email server such as Gmail, Yahoo Mail, or Hotmail, which contains all the email user accounts and email repository among all the email users that form the crowd. In this example, data retrieved from server 304 include the email user accounts and the number of emails exchanged among the email users. Based on such statistics, the incoming message probability (e.g., likelihood of receiving an email) between two users and the outgoing message probability (e.g., likelihood of sending an email) between two users can be constructed.

In a second example, data source server 305 contains all the phone call history of customers of a mobile service provider. In this example, all mobile phone users from a service provider such as Verizon, AT&T, or Sprint form a crowd network. The adjacency and message probability matrices can be determined by the usage of phone calls and/or texting among the mobile phone users. For example, the outgoing message probability (e.g., making a phone call) from user A to B equals the number of phone calls made from user A to B divided by the total number of phone calls made from user A.

In a third example, data source server 306 is a social network website, in which all the registered users and communications (messages and postings etc.) are stored on the server 306. The crowd is formed by users registered in the social network website, such as Facebook, LinkedIn, or Twitter. If user i and user j are connected (e.g., friends in Facebook, connected in LinkedIn, or follower in Twitter), then there is an edge/link in the graph and the corresponding element $a_{ij}$ in the adjacency matrix is 1. Also, the incoming and outgoing messaging probabilities can be determined based on how much interaction has occurred between these two users.

In a fourth example, data source server 307 represents other networks in which messages are implicitly communicated with each member of the network. There exist some other types of networks, e.g., influence networks or citation networks, in which messages are implicitly sent and received. For example, one member of the network is influenced by another member of the network to buy a pair of NIKE shoes without being explicitly told to do so. These types of networks are also applicable as long as the statistics of such implicitly communicated messages can be collected by data source server 307.

From the above examples, it can be seen that as the value of a crowd can be quantified under Equation (2), the effectiveness or engagement of different social networks (e.g., Facebook vs. LinkedIn) can be compared. These comparisons could have multiple usages. For example, the result of comparing social network websites can be utilized as one of the criteria in selecting a website as an advertisement vendor.

Figure 4:
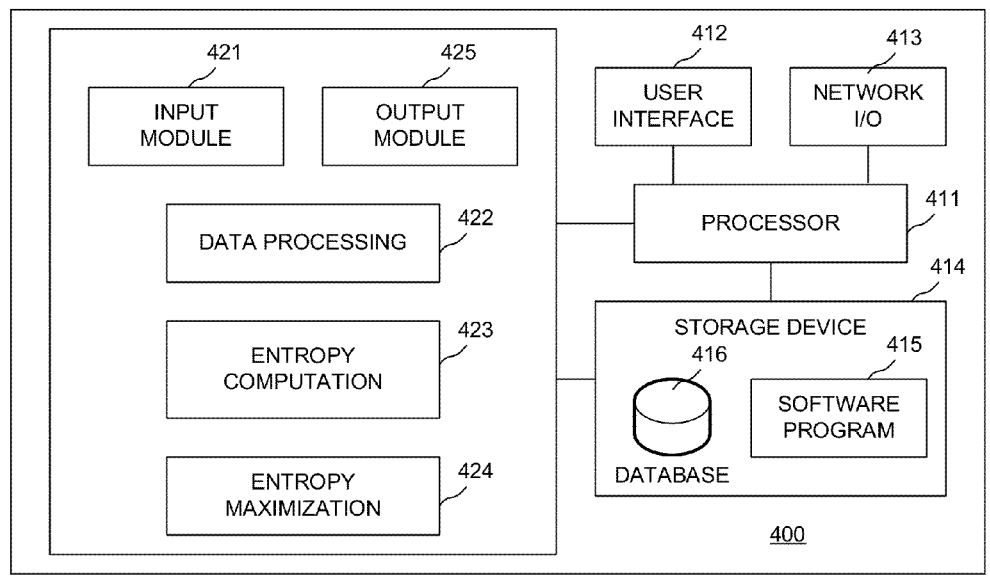
FIG. 4 is a simplified block diagram of a server computer that computes the value of a crowd network.

FIG. 4 is a simplified block diagram of a server computer 400 that computes the value of a crowd network. Server Computer 400 comprises a processor 411, a user interface and peripherals 412 such as monitor, keyboard and mouse, a network input and output (I/O) module 413 for sending and receiving data, and a storage device 414 for storing data. The storage device 414 is a type of computer-readable medium (i.e. a type of memory such as RAM, ROM, CD, DISK, etc.), and further comprises software programs 415 and a database 416 that implement the computing of the value of a crowd. Software programs 415 comprise program instructions stored in the computer-readable medium, when executed by processor 411, causing the processor and other software and/or hardware modules to perform desired functions.

FIG. 4 also shows the main functional modules on server 400. The functional modules include an input module 421, an output module 425, a data processing module 422, a network entropy computation module 423, and an entropy maximization module 424. Input module 421 retrieves data from external servers or users. Data processing module 422 processes the input data related to the activity of a crowd and constructs data such as the adjacency matrix, the incoming message probability matrix, and the outgoing message probability matrix. The constructed data is stored in the server database 416. Entropy computation module 423 computes the network entropy from the constructed data and then calculates the value of the crowd based on the network entropy. Entropy maximization module 424 implements a heuristic algorithm to find the maximum value of a crowd network. Finally, output module 425 displays the results from module 423 and module 424 and optionally plots the crowd network in graphics. The different functional modules may be implemented in software, firmware, hardware, or any combinations thereof. The functional modules may be running on the same computer server, or on several different computer servers.

Figure 5:
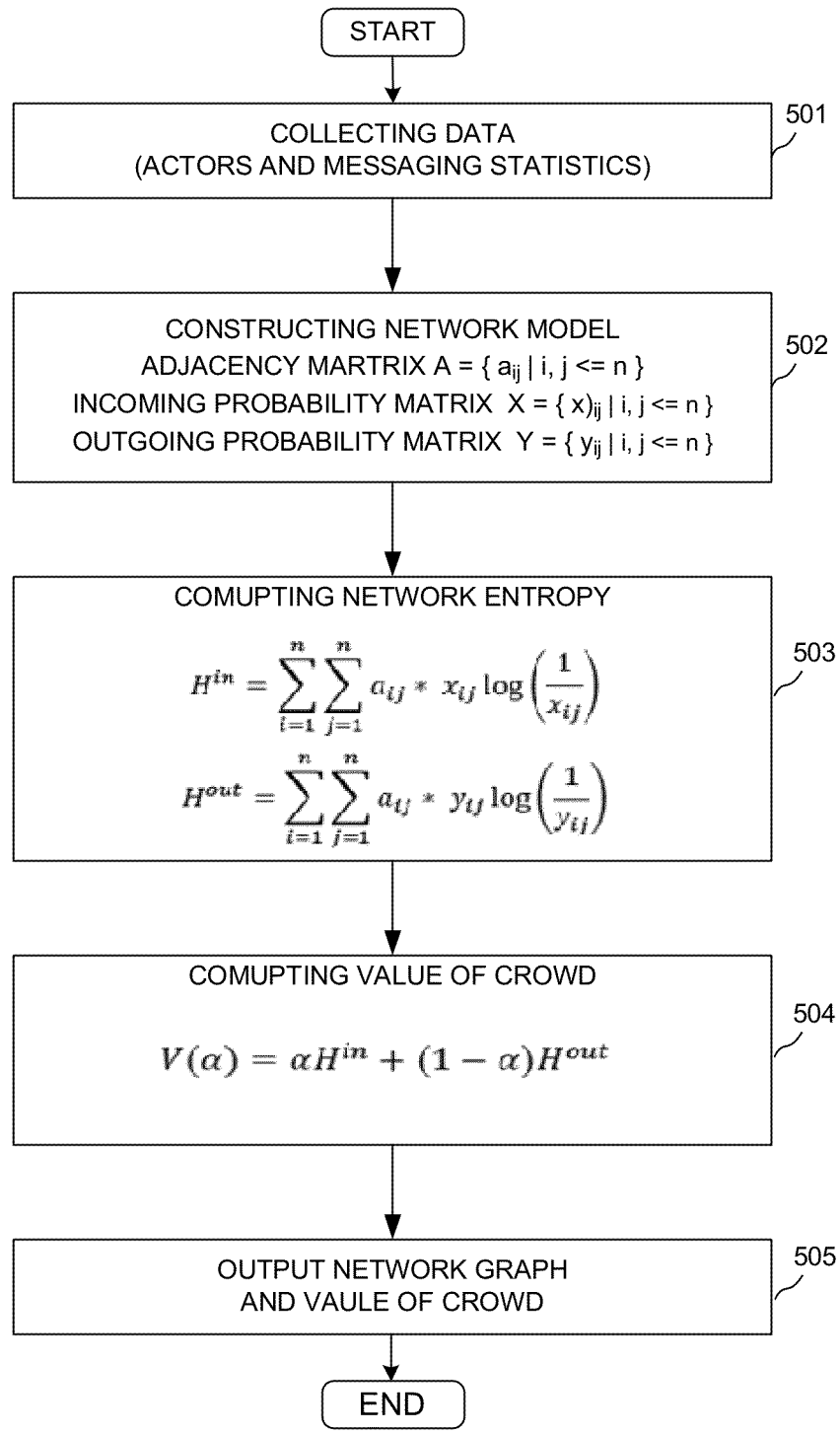
FIG. 5 is a flow chart for calculating the value of a crowd network using network entropy.

FIG. 5 is a flow chart for processing input data and calculating the value of a crowd network using network entropy. The statistics information about a crowd network is collected at block 501. The statistics include communication nodes and the messaging statistics among all the nodes. From the input data, number of nodes (n) is identified. Number of messages received by a node from each of the other nodes can be determined as well. Number of messages sent by a node to each of the other nodes can also be determined. At block 502, the input data is transformed into adjacency matrix $A=\{a_{ij}|i, j<=n\}$, incoming message probability matrix $X=\{x_{ij}|i, j<=n\}$ and outgoing message probability matrix $Y=\{y_{ij}|i, j<=n\}$. Using matrices A, X and Y, incoming network entropy $H^{in}$ and outgoing network entropy $H^{out}$ can be calculated using Equation (1) at block 503. At block 504, the value of the crowd is obtained based on the network entropy and a predefined variable α. At last, the value of crowd is output to a user interface. The output can also include the graphical display of a directional graph that represents the crowd network.

Crowds can be represented as complex networks with different topologies and internal structural properties like small worlds, community organization, component structure, sparseness, etc. Therefore, crowds can also be analyzed for their complex network properties like the clustering in a network, shortest path lengths, size of the giant component etc. One way to analyze the relationship between the network topologies/structural properties with the value of the network is via the application of an entropy maximization algorithm. The main objective of the algorithm is to find a network topology that maximizes the entropy of the crowd network (value of the crowd) in terms of the incoming and outgoing probability distributions of the crowd network.

Figure 6:
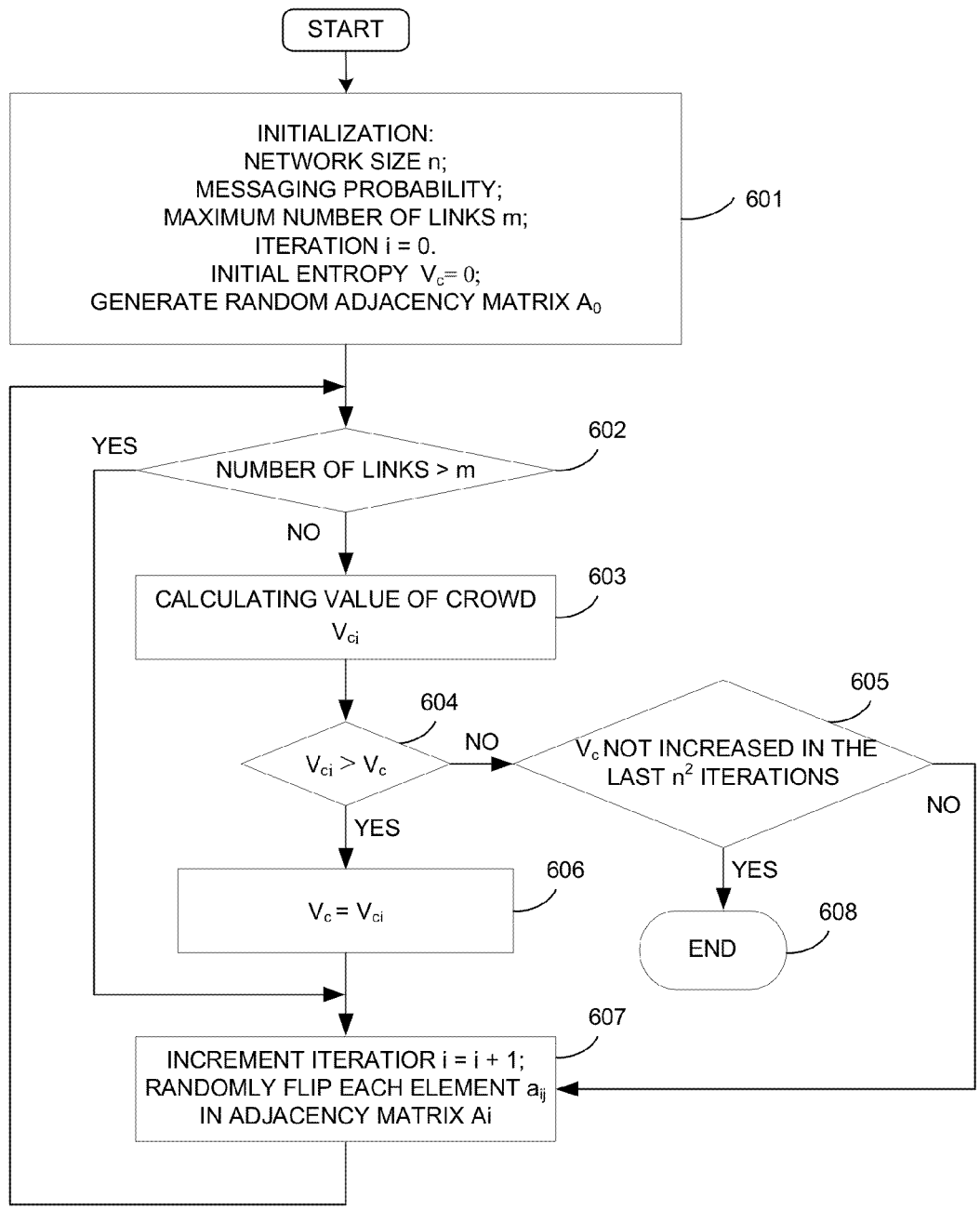
FIG. 6 illustrating a flow chart of a method of finding the network topology for having the maximum value of a crowd network.

FIG. 6 illustrating a flow chart of a method of finding the network topology that produces the maximum entropy of a crowd network with size n. Since the proposed method is based on an iterative heuristic algorithm to find the best result, the criteria for when to stop the heuristic algorithm has to be established. For example, the algorithm will stop if the result has not been improved for $n^2$ iterations. The limit of $n^2$ times to check for the best candidate is selected arbitrarily. In experience, if allowed to proceed, then the algorithm keeps on looking for better network topologies in terms of the given incoming and outgoing probability distributions. In theory, the maximum entropy is achieved when all the nodes in the network are fully connected. However, a fully connected network generated by this process has no meaning from the point of view of the structural regularities which we are trying to analyze. The topologies to be examined should have certain constraints on the "cost". For example, in order to be considered as a potential best candidate, a network topology should have less than a pre-defined maximum number of links.

Initialization is performed at block 601 to set the network size n, the message probability distribution, and the maximum number of links m. In addition, working variables including Iterator i and initial value of crowd $V_C$ are set to be 0. For initial iteration i=0, adjacency matrix $A_i$ with size n×n is randomly generated. At block 602, checking is performed to make sure that the matrix has less than m links. If the number of links exceeds m, a new iteration starts at block 607. At block 603, the value of crowd represented by matrix $A_i$ is calculated using network entropy. If the newly calculated value $V_{ci}$ is greater than the existing value Vc, a better topology is found and Vc is set to the newly found value $V_{ci}$ at block 606 and a new iteration starts at block 607. Otherwise, if $V_{ci}$ is not greater than Vc, a checking at block 605 is made to see if Vc has ever increased in the last $n^2$ iterations. If not, the process ends. Otherwise, a new iteration starts at block 607, which randomly flips each element $a_{ij}$ with probability (p) in the adjacency matrix $A_i$.

Figure 7A:
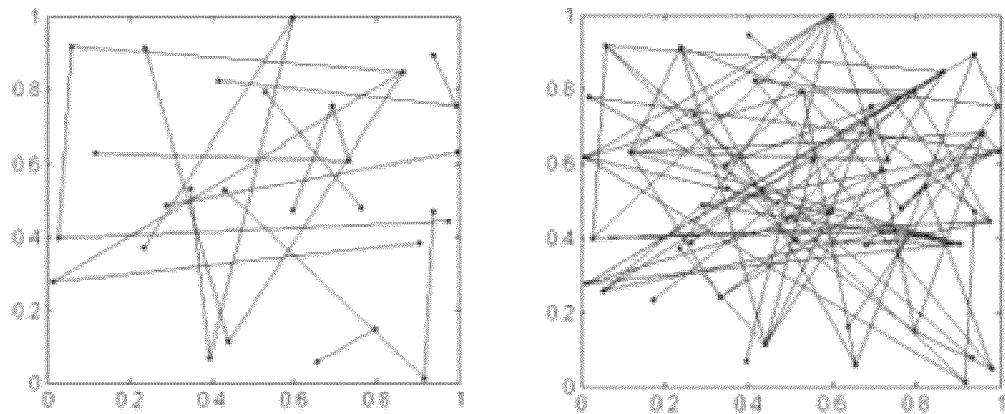
FIGS. 7A and 7B depict the evolution of the graphical structure through the process of entropy maximization.
Figure 7B:
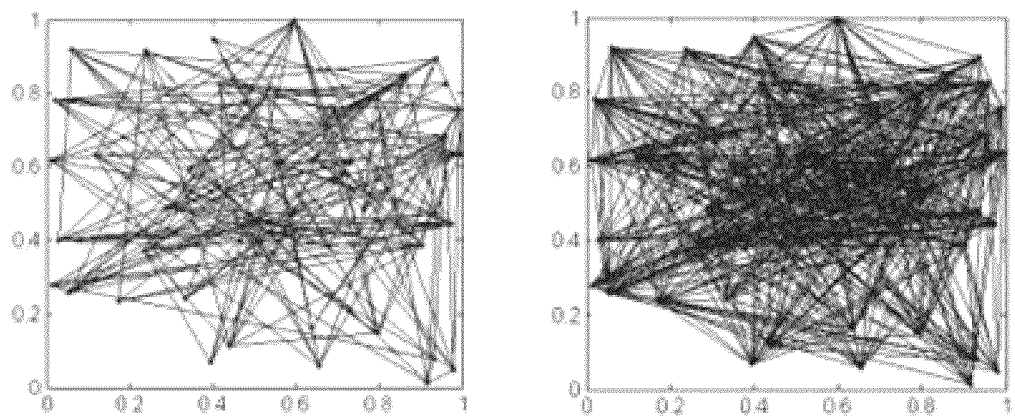

FIGS. 7A and 7B depict the evolution of the graphical structures of a crowd network through the above-illustrated entropy maximization process. As the cumulative entropy increases, so do the number of connections. In the above given model, the entropy of a network is a function of the topological features of the network. The algorithm tries to maximize the network entropy such that more nodes communicate with each other. From the process, it has been observed that the behavior of four structural parameters with respect to the cumulative entropy of the network.

Figure 8:
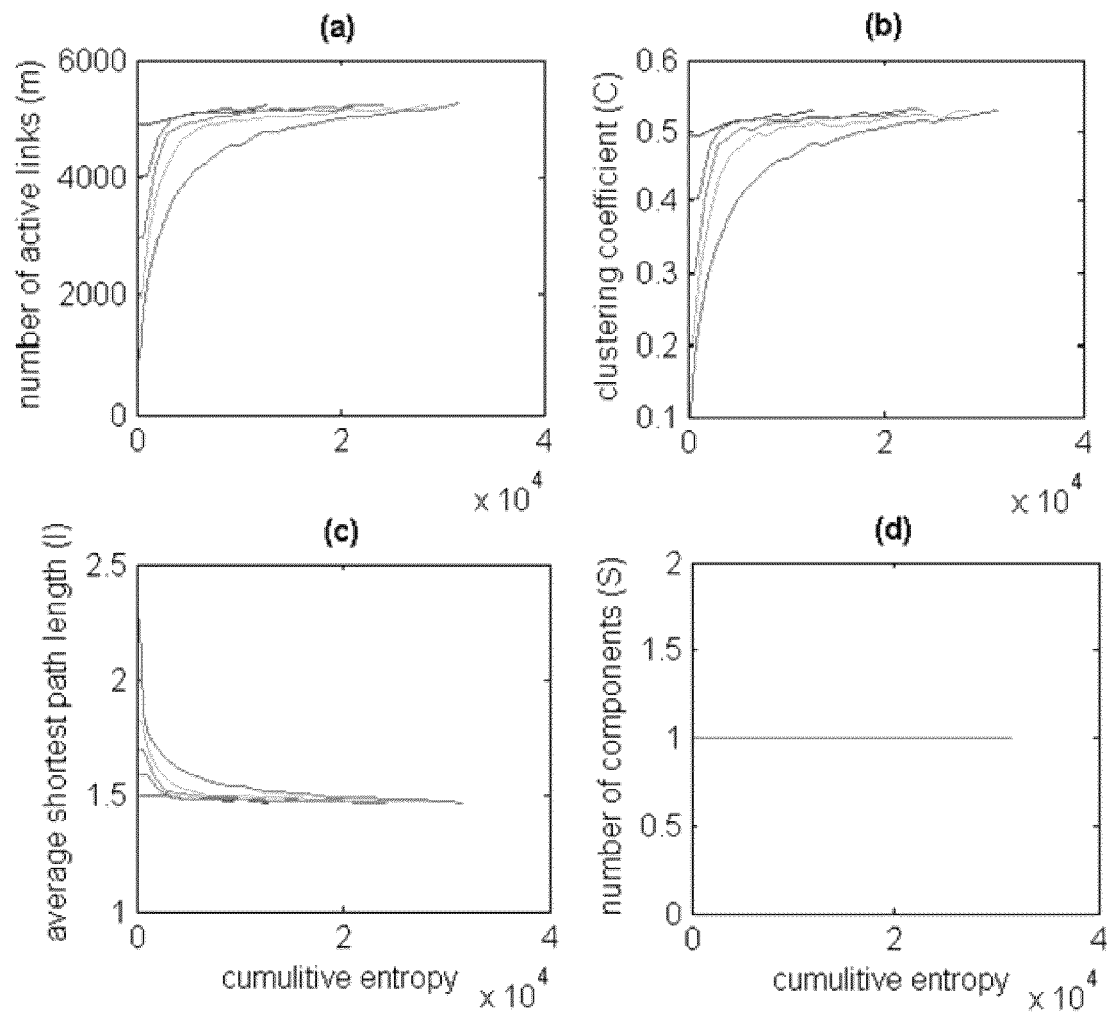
FIG. 8 shows the behavior of four structural parameters plotted against the increasing cumulative entropy of a crowd network.

FIG. 8 shows the behavior of four structural parameters plotted against the increasing cumulative entropy of the network. For all the networks, the number of nodes n=100 and the weighing parameter is constant at α=0.5. The link density probability (p) is varied from 0.5 to 0.9. For all values of p<0.5, the parameters display more or less linear behavior. In all cases after an initial sudden increase/decrease, the values quickly normalize to theoretical limits.

FIG. 8(a) shows that as the cumulative entropy increases so do the number of active links (m) in a network. The total number of active links represents number of connections between nodes in the network. This means that the value of a crowd increases with the number of people communicating with each other, which seem to be self-evident. FIG. 8(b) shows as the number of links increases so does the clustering coefficient (c) along with the network entropy. Clustering coefficient is defined as the fraction of nodes which form triangles in a network. The formation of a triangle is indicative of how closely related neighbors are inside a network. It is self-evident that the value of a crowd increases with the increase of the clustering in a network. As more nodes begin forming clusters (of basic size 3 in this measure), which results in high local clustering and therefore better engagement. FIG. 8(c) shows the decrease in the average shortest path length (l) along with the network entropy. The average shortest path length measures the average distance in terms of number of hops between any two nodes in a network. It is observed that as the cumulative entropy increases, the average shortest path length decreases from over 2 to 1.5. The value of a network increases if more nodes are accessible in shorter paths from each other. FIG. 8(d) shows the number of disconnected components (s) very quickly decreases to 1 forming a single giant component with increasing network entropy. Connected components are those nodes in a network which are accessible from each other directly or through a different path. A network may contain many components in which the nodes within a component are accessible to each other but one component is not connected to another. In this case, the nodes in different components are assumed to be at infinite distance from each other. A network with a single giant component, where s=1, is obviously better from the point of view of crowd engagement since all the nodes in the graph are accessible through a path.

From the above analysis, first, it is observed that the entropy optimization process leads to networks which are small worlds with increasing clustering and decreasing shortest path length. Small worlds are characterized by low average shortest path length and high clustering. This phenomenon is observed when the average distance between two nodes grows logarithmically with the size of network. Thus, the value of a crowd in terms of network engagement is inherently associated with its small world-ness. Second, as the network gets denser in terms of the number of links the engagement increases. This means that the average number of nodes an individual node connects to increases with the entropy. This may seem self-evident as the number of links increase through the optimization process. The value of crowd then is a function of the average number of nodes a node connects to (average degree). Third, the connectedness of a network is usually measured in terms of the number of components. As it is seen from FIG. 8, during the process of optimizing, the network very quickly forms a single giant component consisting of all the nodes from a few disconnected components in the beginning as the entropy increases. This means to achieve a higher value for a crowd, it is essential that most of the nodes be connected to each other through some path if not directly connected. Despite the sparsity of the network during the initial stage of optimization, it is observed the giant component is formed very quickly in proportion to the sparsity. Thus a connected crowd is a better engaged crowd.

In one or more exemplary embodiments, the functions described above may be implemented in hardware, software, firmware, or any combination thereof. If implemented in software, the functions may be stored on or transmitted over as one or more instructions or code on a computer-readable (processor-readable) medium. Computer-readable media include both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that both can be used to carry or store desired program code in the form of instructions or data structures, and can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and blue-ray disc where disks usually reproduce data magnetically, while discs reproduce data optically with lasers. Combinations of the above should also be included within the scope of computer-readable media.

Although the present invention has been described in connection with certain specific embodiments for instructional purposes, the present invention is not limited thereto. For example, although a crowd is referred to as a social network of people communicating with each other in most examples, the crowd can be extended to other connected networks such as machine-to-machine networks. In one specific example of a power grid, power supplies are nodes and power lines are links. Accordingly, various modifications, adaptations, and combinations of various features of the described embodiments can be practiced without departing from the scope of the invention as set forth in the claims.

What is claimed is:

1. A method for computing a value $V_C$ of a crowd network C, the method comprises:

assigning an initial value to $V_C$;

collecting statistics information representing communication activities among a total of n communication nodes in the crowd network;

constructing an adjacency matrix A, an incoming message probability matrix X, and an outgoing message probability matrix Y of the crowd network, wherein the incoming message probability matrix $X=\{x_{ij}|i,j<=n\}$, wherein $x_{ij}$ denotes an incoming message probability of node i to receive info from node j, and the outgoing message probability matrix $Y=\{y_{ij}|i,j<=n\}$, wherein $y_{ij}$ denotes an outgoing message probability of node i to transmit info to node j, and wherein the incoming message probability matrix X and the outgoing message probability matrix Y are determined at least in part based on the collected statistics information;

computing an inbound entropy $H^{in}$ of the crowd network using matrices A and X, and an outbound entropy $H^{out}$ of the crowd network using matrices A and Y;

calculating an updated value $V_C'$ of the crowd network using the inbound entropy $H^{in}$, the outbound entropy $H^{out}$, and a pre-defined weighting parameter $\alpha$;

assigning the updated value $V_C'$ to $V_C$ if the updated value $V_C'$ is greater than a previous value $V_C$;

repeating the constructing, computing, calculating, and assigning steps until the value $V_C$ has not been increased in the last $n^2$ iterations; and outputting the value $V_C$ indicating a maximum value of the crowd network C.

2. The method of claim 1, wherein the adjacent matrix $A=\{a_{ij}|i,j<=n\}$, wherein $a_{ij}$ denotes an existence of a link between nodes i and j.

3. The method of claim 1, wherein the statistics information is collected from a social network website, wherein each node is associated with a registered user, and wherein communication activities include sending and receiving messages and postings comments among the registered users.

4. The method of claim 1, wherein the statistics information is collected from an email server, wherein each node is associated with an email user, and wherein communication activities include sending and receiving emails among the email users.

5. The method of claim 1, wherein the statistics information is collected from a mobile phone service provider, wherein each node is associated with a mobile customer, and wherein communication activities include phone calls and text messages among the customers.

6. The method of claim 1, wherein the statistics information is collected from an influence network server, wherein communication activities include sending and receiving messages implicitly in the influence network.

7. A method for optimizing a value $V_C$ of a crowd network C by a server computer, the method comprises:

(a) initializing a set of network parameters including a crowd network size n, an initial value $V_C=0$, an incoming message probability matrix X, and an outgoing message probability matrix Y of the crowd network, wherein the incoming message probability matrix $X=\{x_{ij}|i,j<=n\}$, wherein $x_{ij}$ denotes an incoming message probability of node i to receive info from node j, and the outgoing message probability matrix $Y=\{y_{ij}|i,j<=n\}$, wherein $y_{ij}$ denotes an outgoing message probability of node i to transmit info to node j, and wherein the incoming message probability matrix X and the outgoing message probability matrix Y are determined at least in part based on collected statistics information;

(b) generating a random adjacency matrix A with a total number of links less than m;

(c) computing an inbound entropy $H^{in}$ of the crowd network using matrices A and X, and an outbound entropy $H^{out}$ of the crowd network using matrices A and Y;

(d) calculating an updated value $V_C'$ using $H^{in}$, $H^{out}$, and a weighting parameter $\alpha$;

(e) assigning the updated value $V_C'$ to $V_C$ if the updated value $V_C'$ is greater than a previous value $V_C$;

(f) repeating (b) to (e) until the value $V_C$ has not been increased in the last $n^2$ iterations; and (g) outputting the value $V_C$ indicating a maximum value of the crowd network C with no more than m links.

8. The method of claim 7, wherein the adjacent matrix $A=\{a_{ij}|i,j<=n\}$, wherein $a_{ij}$ denotes an existence of a link between nodes i and j, and wherein $a_{ij}$ is applied with a uniformly randomly generated probabilty p in (b).

9. The method of claim 7, wherein the value $V_C$ of the crowd network is substantially maximized when the total number of links (m) increases.

10. The method of claim 7, wherein the value $V_C$ of the crowd network is substantially maximized when a clustering coefficient (c) increases.

11. The method of claim 7, wherein the value $V_C$ of the crowd network is substantially maximized when an average shortest path length (l) decreases.

12. The method of claim 7, wherein the value $V_C$ of the crowd network is substantially maximized when a total number of components of accessible nodes (S) decreases.

13. The method of claim 1, wherein the initial value of $V_c$ is 0.

14. The method of claim 1, wherein the assigning step also comprises assigning a maximum number of links m and the outputted value $V_c$ indicates a maximum value of the crowd network C with no more than m links.

\* \* \* \* \*